United States Patent [19]

Gregory et al.

[11] Patent Number: 5,347,204
[45] Date of Patent: Sep. 13, 1994

[54] POSITION DEPENDENT RATE DAMPENING IN ANY ACTIVE HAND CONTROLLER

[75] Inventors: William W. Gregory, St. Petersburg; James W. Kauffman, Palm Harbor, both of Fla.

[73] Assignee: Honeywell Inc., Minneapolis, Minn.

[21] Appl. No.: 957,427

[22] Filed: Oct. 6, 1992

[51] Int. Cl.$^5$ .................. G05B 5/01; B64C 37/00
[52] U.S. Cl. .................. 318/632; 318/618; 74/471 XY; 244/223
[58] Field of Search ........... 318/139, 628, 560–663; 74/491, 523, 471; 244/223, 234, 236, 237, 228; 200/6 A, 6 R; 901/22, 34; 338/128; 340/870.32, 870.35

[56] References Cited

U.S. PATENT DOCUMENTS

| | | | |
|---|---|---|---|
| 3,270,260 | 8/1966 | Mehr | 317/255 |
| 3,617,849 | 11/1971 | Charlton | 318/616 |
| 3,819,999 | 6/1974 | Platt | 318/609 |
| 3,820,712 | 6/1974 | Oswald | 318/618 X |
| 4,049,223 | 9/1977 | Watson | 318/584 |
| 4,096,426 | 6/1978 | Tremaine et al. | 318/611 |
| 4,150,803 | 4/1979 | Fernandez | 244/135 A |
| 4,236,685 | 12/1980 | Kissel | 244/223 |
| 4,242,622 | 12/1980 | Shepard, Jr. | 318/618 X |
| 4,284,929 | 8/1981 | Garrett et al. | 318/51 |
| 4,321,517 | 3/1982 | Touchton et al. | 318/618 |
| 4,403,179 | 9/1983 | Kohzai et al. | 318/632 |
| 4,536,746 | 8/1985 | Gobeli | 74/471 XY |
| 4,651,272 | 3/1987 | El-Ibiary et al. | 318/632 X |
| 4,733,214 | 3/1988 | Andresen | 338/128 |
| 4,774,651 | 9/1988 | El-Ibiary et al. | 318/632 X |
| 5,076,517 | 12/1991 | Ferranti et al. | 74/471 XY |
| 5,109,165 | 4/1992 | Gusakov | 307/359 |
| 5,116,180 | 5/1992 | Fung et al. | 901/9 |

Primary Examiner—Paul Ip
Attorney, Agent, or Firm—Kenneth J. Johnson

[57] ABSTRACT

A control system for an active hand controller, for example, uses a control stick connected to and controlled by a motor. Electronics are provided to control the motor to eliminate oscillations due to motor torque and high gain due to breakout at the control stick when the control stick is at about its null position. Both hardware as well as software implementations can provide position dependent dampening to the control sticks such that when the control stick is located about a null position, a higher rate of dampening is provided than when the control stick is located outside the null position, when a lower rate of dampening is provided. The system provides a stable active hand controller control stick without degraded force and feel characteristics of the system.

9 Claims, 5 Drawing Sheets

POSITION DEPENDENT RATE DAMPENING IN ANY ACTIVE HAND CONTROLLER

The invention described herein was made in the performance of work under NASA Contract No. NAS9-18200 and is subject to the provisions of §305 of the National Aeronautics and Space Act of 1958 (42 U.S.C. 2457).

CROSS REFERENCE TO RELATED APPLICATIONS

This application is related to application Ser. No. 07/957,216 which is now U.S. Pat. No. 5,291,113, and application Ser. No. 07/957,278 is now U.S. Pat. No. 5,264,768.

BACKGROUND OF THE INVENTION

This invention is related to an active hand control system of the type wherein manual control input devices such as control sticks employed in a servo-coupled control system are provided with an electrically generated and controlled simulated variable rate feel. In particular, the invention relates to a system having a control stick such as is employed in aircraft, which is servo-coupled to the control system of the aircraft through electronics and a motor mechanism.

The electronics and motor mechanism of these types of systems provide a simulated feel to the control stick when in operation which is similar to that of a purely mechanical system. Yet more specifically, in these types of systems when the control stick thereof is positioned near a null or center position, it begins to oscillate due to the high gain in the torque versus position curve used to achieve breakout forces by the motor which is driving and is in turn driven by the control stick, as well as oscillations caused by gear backlash at connection of the control stick to the motor. The system in accordance with the invention eliminates such oscillations at about the null position for the control stick without degrading the force and feel characteristics of the control stick.

Servo-control technology is well developed as applied in the field of robotics. In particular, electrical motor and servo-control systems have been developed and employed in the past in the design of robotic hand controllers which are capable of reflecting forces experienced at the robotic end, back to, for example, a human operator.

One example of the type of control system to which the present invention is directed is disclosed in U.S. Pat. No. 4,150,803 which teaches a control stick for an operator having an electro-simulated variable rate feel. The simulated feel of the device of U.S. Pat. No. 4,150,803 is provided by a system which generates for the operator at the control stick the proper force and feel characteristics when used to command a boom employed during refueling operations between aircraft in flight.

These types of controllers generally involve the use of a control stick which is actuatable in at least two mutually perpendicular planes to provide both vertical and lateral control of the device being controlled. An example of such a control stick is shown in U.S. Pat. No. 3,270,260, in which the control stick of the device has electrical pickup means in plate form, for example, capacitance bridge circuits arranged in a symmetrical arrangement such that a force exerted on the stick having a symmetrical arrangement of circuits unbalances them and produces a signal which is proportional to the force being exerted on the stick. The signals generated by the electrical pickups are used to generate output signals through appropriate electronics, with the electronics being used to command a control actuator to effect control of the device being controlled.

Typically, in these systems the control stick is mechanically coupled at its axis to at least one motor which applies either a resisting force on the control stick or, response to a signal produced by sensors that detect forces applied to the device surfaces being controlled, drives the control stick and in turn, drives the device being controlled to alleviate forces generated by the device under control as felt by the operator.

These types of controllers are particularly desirable for use in the operation of modern day aircraft, in particular, in the form of control sticks or yokes. In operation, the devices as used in the cockpit of aircraft are typically designed to exhibit some desired force versus displacement characteristics to the user whereby the magnitude of the control stick displacement is proportional to the force applied. The controller produces as its output an electrical signal corresponding to the control stick position, and the signal is used to control the aircraft through the action of various motors and mechanical means, in a manner which is well known to those of ordinary skill in the art and is conventional. Thus, in use such systems provide an electronically controlled manual input control stick having force and feel characteristics like those of purely mechanically linked systems. These applications in aircraft are typically referred to as "fly by wire" applications. Examples of presently existing applications of this technology are the systems employed in the Airbus A300 Transport Aircraft, the General Dynamics F16 Fighter aircraft and the NASA Space Shuttle.

In the past, in order to enhance or improve the force and feel characteristics of such simulated feel control sticks, controller electronics were employed in combination with sensors for detecting the position of the control stick. A signal was generated and processed by controller electronics to drive a motor which in turn drove the control stick to simulate the feel of a mechanical system. Such controller electronics also included input from the system being controlled such as, for example, an auto pilot system reflecting any external forces acting on the flight control surfaces of the aircraft which would, as a result of feedback and input from the surfaces, be input into the controller electronics to be reflected through the motor connected to the control stick at the user.

The use of a feedback loop in which the position of the control stick is detected and a signal resulting therefrom is processed by controller electronics to result in control of a motor to which the control stick is connected to achieve force and feel characteristics typical of a mechanical system is known. In accordance with one improvement as disclosed in copending application no. (attorney docket no. A34-14307(15347-153)), which is incorporated by reference herein and which was concurrently filed herewith, it is recognized that the detection of the position of the control stick fails to fully achieve the desired force and feel characteristics typical of mechanical systems. It is taught in said copending application that a mechanical system can be more fully simulated by also detecting the amount of force being exerted on the control stick, and processing both the position as well as the force signal by controller electronics. This is done to generate a control signal for the motor to which the control stick is connected which reflects both force and position as part of the feedback loop. By reflecting force the loop, the effects of external operational non-linearities resulting from the electromechanical connections of the manual control stick are eliminated.

Notwithstanding the improvement disclosed in said copending application, when the control stick of such a system is located about its null position, a fairly large motor torque causes the hand controller to oscillate at null unless the position signal is exactly at zero when fed to the feedback loop which processes such a signal through the controller electronics. Traditionally, the oscillations at null have been corrected by providing a conventional rate dampening signal manipulation which adds stability to the control loop. However, the impact of providing significant rate damping is a degraded transient response. More particularly, excessive rate dampening, in accordance with the prior art in an active hand controller, makes the hand controller feel viscous. The invention addresses the problems of providing such rate dampening with a degraded transient response.

SUMMARY OF THE INVENTION

In accordance with the invention, it is recognized that the amount of rate dampening required to stabilize a manual input control means, i.e., a control stick, controlled by servo-control loop at about the null position, exceeds that needed at other positions due to the high gain in the torque versus position curve of a motor to which such a control stick is connected to achieve breakout forces. Other causes of such oscillation include resultant gear backlash in operation in the interconnection between the motor and the manual input control means.

In accordance with one aspect, the invention is directed to an improvement in an active hand controller system which has manual input control means, i.e., a control stick, connected to a motor. The motor serves to provide predetermined force and feel characteristics to the manual input control means to be reflected at a user. The motor is connected to control electronics, i.e., a feedback loop, for generating signals which control the motor in response to input signals generated at the manual input control means as well as at the system being controlled, for example, at its flight control surfaces.

In accordance with the invention, selective rate dampening means is provided and serves to provide a signal representing a higher amount of rate dampening to the control electronics means for generating a control signal which dampens the oscillations occurring as a result of the interaction between the motor through the gears with the manual input control means when the manual input control is at about its null position. The selective rate dampening means provides a signal indicative of lesser rate dampening when the manual input control means is positioned at a location other than about its null position. Thereby the system's stability is enhanced without degrading the predetermined force and feel characteristics thereof.

For purposes of this disclosure, it is noted that by "at about its null position" is meant the position of the manual input control means wherein oscillations occur as a result of, for example, the high gain in the torque versus position curve of the motor to which it is connected to achieve breakout forces as well as from oscillations caused by gear backlash at the connection to the motor. "About null" means typically less than about two (2) percent of full displacement of the control stick.

In a yet more specific aspect, the selective rate dampening means in accordance with the invention comprises a switch movable between a first position and a second position which is controlled by a comparator connected to the manual input control means through position detecting means. The position detecting means detects the position of the manual input control means and generates a signal representative of the position for controlling the switch to be in the second position to provide a relatively high gain level signal to the controller electronics means when the manual input control means is at about its null position to increase rate dampening thereof. The switch is arranged to be in the first position to provide a relatively low gain signal to the controller electronics means to provide relatively lower rate dampening when the control stick is not at about the null position.

In a yet still more specific aspect, the invention also includes differentiating means operating on the position signal which represents the position of the manual input control means, i.e., control stick, to generate a signal representative of velocity of movement of the manual control input control means. The differentiating means is connected in a manner wherein the position signal detected and the velocity signal generated are each supplied separately to the selective rate dampening means to be factored into the control of the switch between the first and second positions to determine whether a higher or lower rate dampening is desired in response to the position of the control stick.

In another aspect, the selective rate dampening means in accordance with the invention comprises a digital computer. The computer, by operating software in accordance with the detected position of the manual input control means, calculates and generates a signal of relatively high gain when the manual input control is at about its null position to increase rate dampening thereof. When the detected position is outside about the null position, the signal generated by the software is of relatively lower gain.

In yet another aspect, the invention consists of a method of dampening oscillations in an active hand controller system having manual input control means, i.e., a control stick. The manual input control means is connected to a motor which causes the oscillations to occur in response to feedback signals controlling the motor when the manual input control means is at about its null position. In accordance with the method it is first determined whether the manual input control means is in one of a first position about null or a second position outside of about null. If the manual input control means is at about null, the position signal feedback to the motor is more highly dampened than if outside about null.

Yet still other details of the invention will become apparent from a reading of this specification.

BRIEF DESCRIPTION OF THE DRAWINGS

Having briefly described the invention, the same will become better understood from the following detailed discussion made with reference to the accompanying drawings wherein.

DETAILED DISCUSSION

Figure 1:
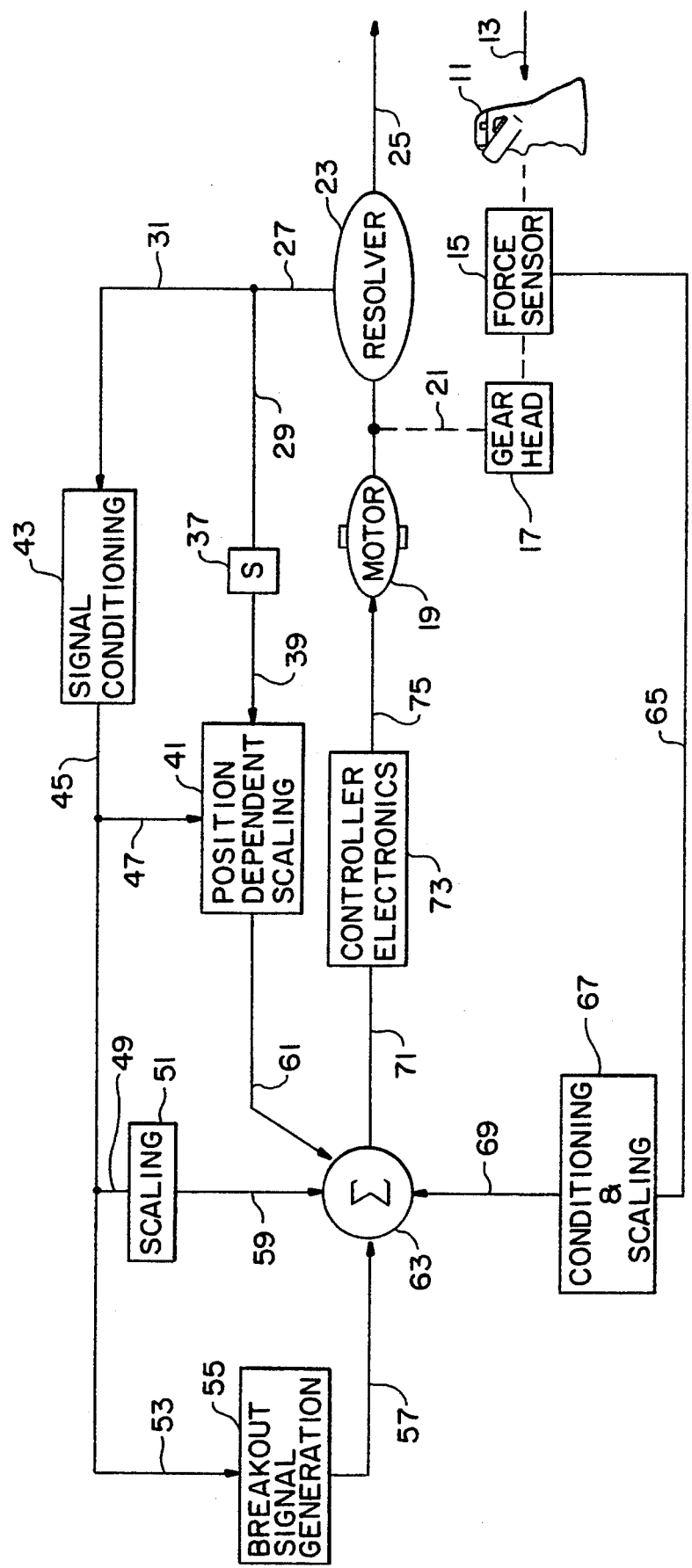
FIG. 1 is a block diagram illustrating the active hand controller system electronics in accordance with the invention, and further showing the means for providing the relatively selective higher dampening for the control stick when the control stick is at about the null position.

In FIG. 1 there is disclosed a block diagram illustrating the selectible rate dampening circuit in accordance with the invention. A control stick 11 with a hand grip thereon has an external force 13 applied thereto by a user, for example, a pilot. The control stick 11 is connected to the motor 19 which provides certain force and feel characteristics back to the control stick 11 to simulate a conventional mechanical system. The control stick 11 is connected through a gearhead 17 to the motor 19, and also has a force sensor 15 connected to the control stick 11 for detecting the magnitude of the force 13 applied to the control stick 11. A resolver 23 which is back-driven by the gearhead 17 as an operator moves the control stick 11, is used to provide the motor 19 rotor position for the purpose of commutating the motor 19. Additionally, a command signal corresponding to the movement of the control stick 11 is provided by the resolver 23 to the system being controlled through line 25. With respect to the position signal generated by resolver 23 which is indicative of control stick 11 position, as well as the signal generated by force sensor 15 indicative of any force applied to control stick 11, these signals are fed back into a control loop to be processed by controller electronics 73 to output a signal through line 75 to control the motor 19 torque to thereby provide appropriate force and feel characteristics to the control stick 11.

A problem with these types of hand controllers is that when the control stick 11 is located about its null or zero position, the control stick 11 begins to oscillate due to torque generated by the motor 19. Traditionally, such oscillations have been controlled by providing rate dampening in the control system for the motor 19. Such rate dampening enhances stability of the control stick but at the high cost of degraded transient response. Excessive rate dampening in an active controller makes the hand controller feel viscous in an undesirable manner.

In accordance with the invention and the circuit illustrated in FIG. 1, rate dampening is provided at a very high gain only when the control stick 11 is located within a small region about the center position. Thus, some stability is provided without degrading the overall feel in use of the control stick 11.

Figure 2:
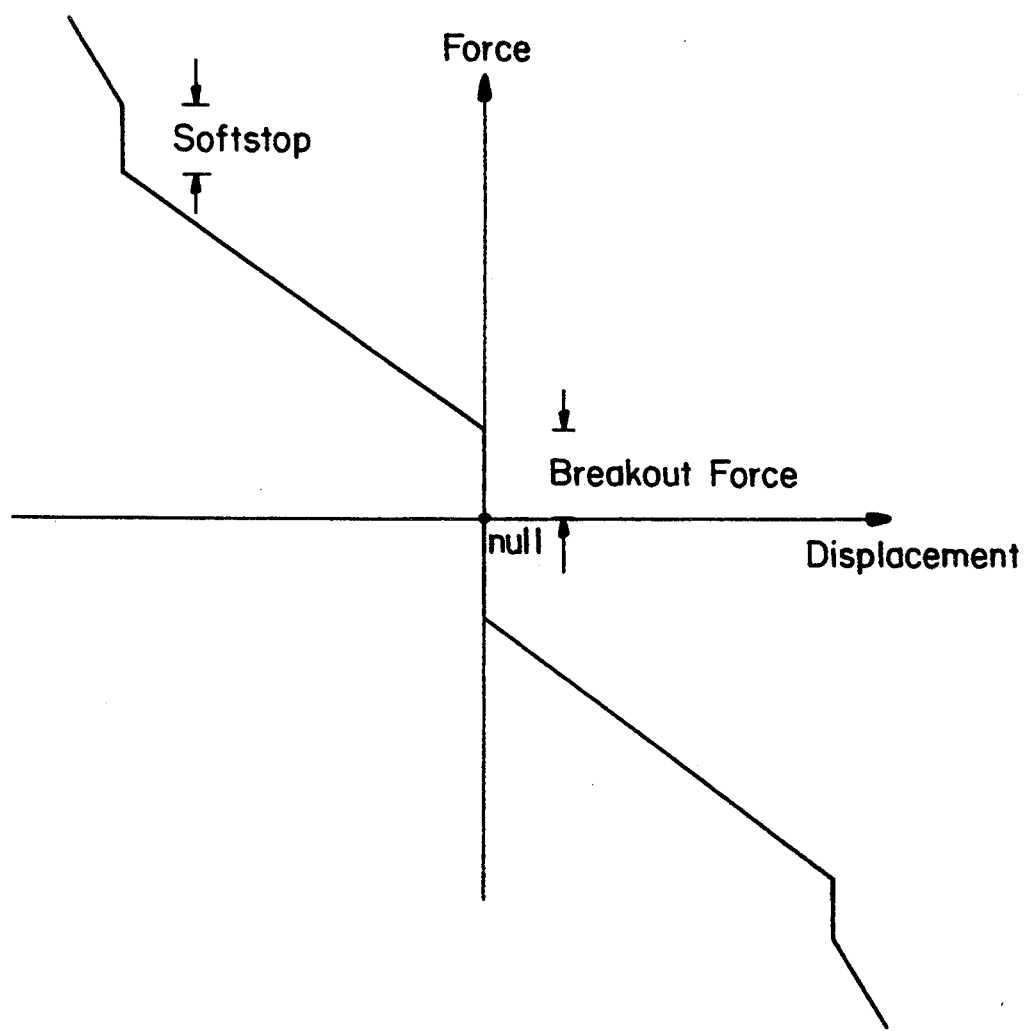
FIG. 2 is a graph illustrating the force versus displacement non-linearities occurring on the control stick at different positions thereof including additional non-linearities of the type which occur, for example, at such locations as are conventionally known as "soft stop"

The reason for providing the higher rate dampening about the center position is illustrated in FIG. 2 which shows that the breakout force about the null position relative to control stick 11 displacement is much greater than at other positions. This is caused by high position loop gain in the torque versus position curve shown in FIG. 2 for the motor 19, as well as because of other characteristics of operation, such as gear backlash at the interconnection between the control stick 11 through the gearhead 17 to the motor 19.

In the embodiment of FIG. 1, the force sensor 15 detects the force exerted on control stick 11 and provides a signal indicative of the force applied through line 65. The signal 65 from the force sensor 15 is conditioned and scaled to create a high level ($\pm 5$ or $\pm 10$ V) bipolar analog signal 69 that changes linearly with force applied at the control stick 11. For example, a strain gauge type force sensor typically has an output signal of $\pm 5$ mV which is highly susceptible to noise. Another example of a force sensor for use in the invention is a force sensor with a modulated AC output dependent on force. The conditioning and scaling electronics 67 transforms the force sensor output 65 into a usable force signal 69. The force signal is provided through line 69 to controller electronics 73 in a manner as disclosed in copending application no. (attorney docket no. A34-14307(15347-153)). Likewise, the feedback loop for the position of the control stick 11 on the upper half of FIG. 1 is similar to that of said copending application with the exception that the position signal generated by the resolver 23 through line 27 is passed through line 29 to differentiating block 37 to have the derivative of said signal taken therein. The derivative is done, for example, by monitoring the rate at which the resolver-to-digital converter increments its digital output up or down, to result in a velocity signal which is passed through line 39 to position dependent scaling block 41.

In the position dependent scaling block 41, the velocity signal 39 is scaled according to the position of the control stick 11 as indicated by the position signal 47. For example at about null, the position dependent scaling block 41 amplifies the rate signal 39 by a factor several times greater than the scale factor at other positions. This could be accomplished by any number of different methods. One such method would be by the circuit shown in FIG. 3. At about null the switch at 105 remains open thereby increasing the gain of the rate signal 39. At other positions the switch remains closed. Similarly this function can be accomplished by software as described with reference to FIG. 5 discussed hereinafter.

The resolver 23 produces a modulated ac output signal 31 which must be demodulated in signal conditioning block 43 in order to produce a usable control signal in a control system. Typically, a resolver-to-digital converter is used as signal conditioning block 43 to transform the resolver output to a digital or binary representation of position. This digital representation of position is then converted to a high level analog signal 45 by a digital-to-analog converter chip also in signal conditioning block 43. The resulting position signal 45 is passed through line 47 to be operated on along with the velocity signal in position dependent scaling block 41. The operation in position dependent scaling block 41 will be discussed in greater detail herein with the reference to FIG. 3. The resultant signal from block 41 is then passed through line 61 to summing device 63. This signal from block 41 serves to have the controller electronics 73 provide either a high or a low gain dampening signal through line 75 to motor 19 depending upon whether the control stick 11 is at or about its null position, or outside of its null position.

As also illustrated in FIG. 1, the position signal is also passed through line 49 into scaling block 51 and after scaling in a conventional manner is passed through line 59 into summing device 63. The position signal is also passed through line 53 to account for breakout force characteristics of the control stick 11 by being processed in breakout signal generation block 55 and passed through line 57 in summing device 63 from where the combined signals are passed through line 71 into controller electronics 73 to provide the appropriate control signal to motor 19.

Figure 3:
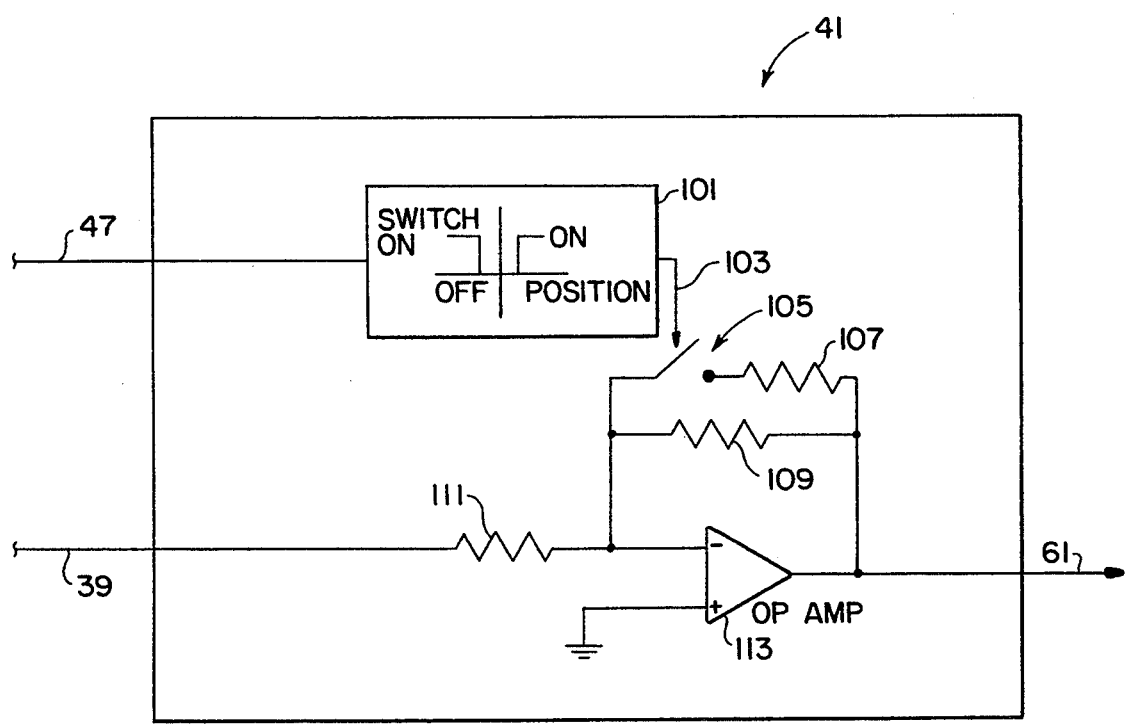
FIG. 3 is a more detailed diagram illustrating the details of the block employed in the circuit diagram of FIG. 1 to show how selective rate dampening is provided to control the motor connected to the control stick of the invention.

As illustrated in FIG. 3, the amount of dampening provided to the control stick 11 is dependent on the magnitude of the signal resulting from position dependent scaling block 41 at line 61. The dampening is controlled by the circuit of the position dependent scaling block 41 by means of the gain provided through operational amplifier 113, hereinafter op-amp 113. As can be seen from FIG. 3, the op-amp 113 is arranged in an inverting amplifier circuit configuration with the velocity signal through line 39 being passed through resistor 111 into the negative input of op-amp 113. Across the input and output of the op-amp 113 are located a pair of resistors 107 and 109 arranged in parallel with a switch 105 being controlled by control function block 101. The control function block 101 serves to issue a signal through line 103 to switch 105 to either open or close the switch 105. When the switch 105 is closed the position signal is passed across resistor 107 along with the velocity signal incoming through line 39. Whether the switch 105 is opened or closed is dependent upon the position signal coming through line 47 from resolver 23. As can be appreciated, in accordance with the invention, the gain for the position dampening signal from position dependent scaling block 41 is controlled in accordance with the actual position of the control stick 11 detected.

Figure 4:
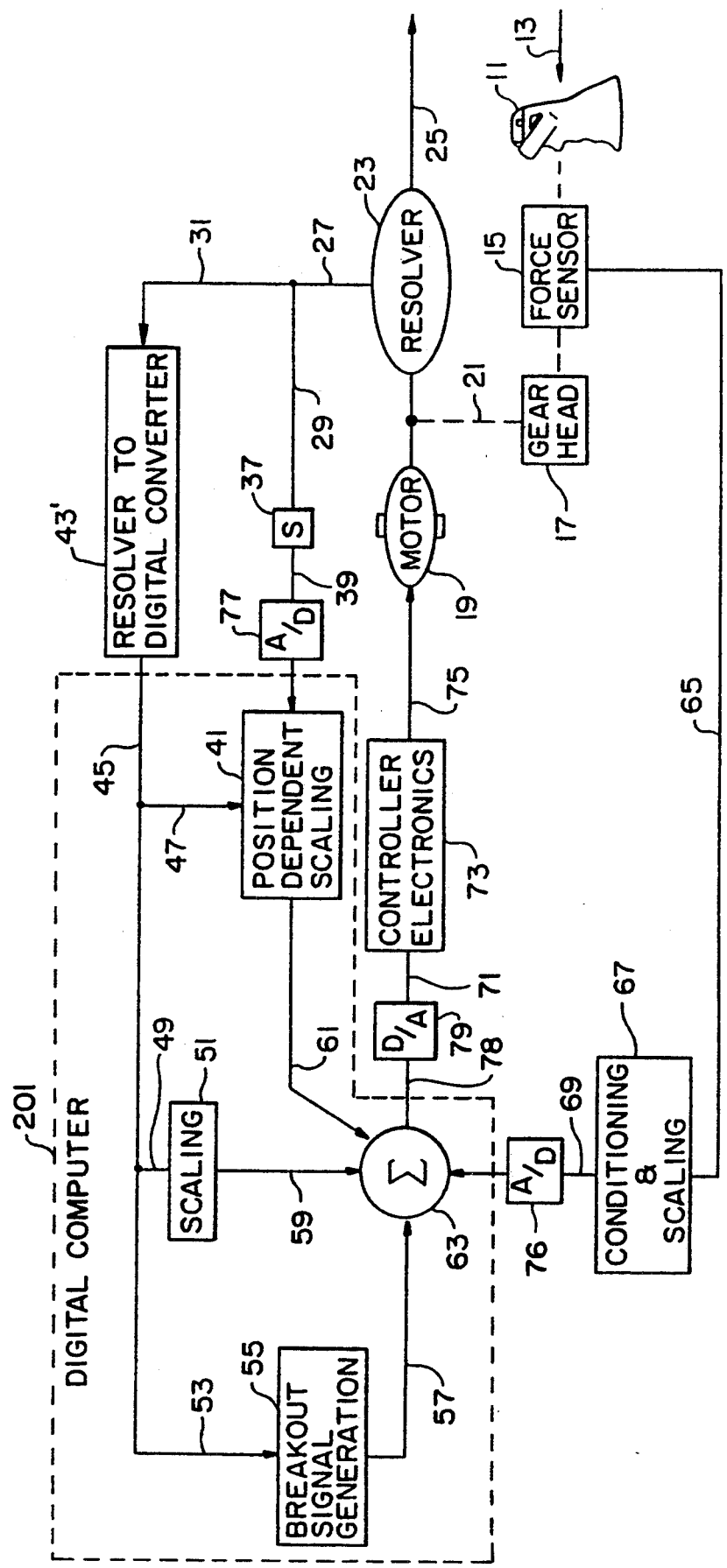
FIG. 4 is a block diagram illustrating an alternate embodiment of the active hand controller system of the invention as modified to implement the software illustrated in the flowchart of FIG. 5.
Figure 5:
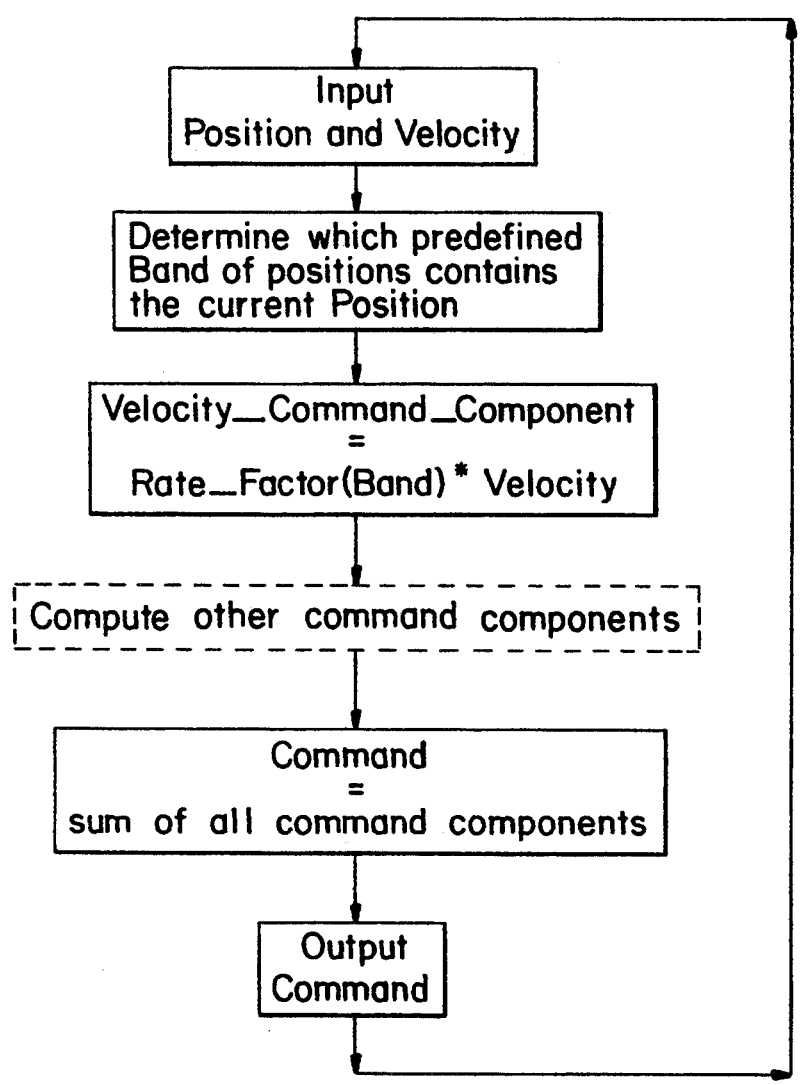
FIG. 5 is a general flowchart diagram illustrating the position dependent rate dampening of the invention provided as a software version of a component of an endless control loop to provide rate dampening as a function of position.

FIG. 4 illustrates an alternative implementation of the invention where a digital computer is used to close the control through a specific software implementation described with reference to FIG. 5. In FIG. 4 like elements are numbered the same as for FIG. 1 and function the same unless otherwise noted. In the control system of FIG. 4, the high level torque signal at line 69 and the rate signal at line 39 are converted to digital signals by analog to digital converters 76 and 77. A digital computer 201, shown in dashed lines replaces the elements shown enclosed thereby to calculate, through the software described with reference to FIG. 5, and based on the input digital rate, position and torque signals, a desired and calculated motor torque signal which through line 78 is passed to digital to analog converter 79 to be acted on by controller electronics 73 in a manner similar to FIG. 1. In the case of FIG. 5, the signal conditioning block 43 is now shown as resolver to digital converter 43' which was previously discussed with reference to FIG. 1 as an example of the type of device that could be used as the signal conditioning block 43.

The system of FIG. 4 operates as more particularly described with reference to the flowchart of FIG. 5 wherein the software version of the invention is implemented in an endless loop which provides rate dampening as a function of position. Components unrelated to rate dampening which are needed to form the complete control loop are shown for reference purposes in the block in dashed lines, but are not necessary to illustrate the concept of the invention. Such component steps in the program are conventional and well known to those of ordinary skill in the art.

Turning now to the software implementation of the invention, at the top of the control loop current real-time measurements of position and velocity are input. Specifically, position and velocity in this implementation may be vector quantities, for example, for a conventional six axis active hand controller, the position and velocity will be six component vectors. Subsequent to such input step, a list of pre-defined non-overlapping position bands or intervals are examined to determine in which band the current position is located. For multi-axis systems where the position is represented as a vector, a band is determined independently for each axis.

The "velocity—command—component" is the component of the output feedback command which is responsible for implementing rate dampening. The amount of rate dampening is computed for each axis by multiplying the "rate-factor" for the current band with the velocity detected for movement of the control stick 11. Typically, "rate-factors" are negative numbers used to achieve the dampening, i.e., a force in opposition to the current velocity. The "rate-factors" are tabulated by the band for each axis independently. The feedback command is then computed by summing the "velocity—command—component" with any other command components which may be needed for reasons other than rate dampening. The summed components result in a vector sum for a multi-axis active hand controller system. Finally, the feedback command is output to the system being controlled and the loop is closed by repeating the above sequence for the next iteration.

It is noted that the concept of the invention as illustrated in hardware in FIG. 1 and software in FIG. 5 can be expanded to be employed with multiple position bands with multiple degrees of rate dampening for hand controllers having multiple axes. One such application where multiple bands are needed include a system with "soft stops" programmed into the force displacement curve as illustrated in FIG. 2. Soft stop is a conventional and well known concept to those of ordinary skill in the art and need not be disclosed in greater detail herein. With soft stops increased dampening will be needed at the soft stop non-linearity on the force versus displacement curve. Thus, additional position bands would be needed around the two positions to keep the systems stable as the controller passes through the soft stop non-linear portion of the curve.

Having generally described the invention, the same will become better understood as defined in a non-limiting manner from the appended claims.

What is claimed is:

1. An active hand controller system comprising:
   manual input control means;
   a motor in connection with said manual input control means to provide desired force and feel characteristics of said manual input control means;
   sensing means which senses predetermined characteristics, including position, of said manual input control means and generates output signals indicative of said predetermined characteristics;

controller electronic means which controls said motor in response to input signals;

feedback means electrically connected to said sensing means to provide said input signals to said controller electronic means; and selective dampening means electrically connected to said sensing means which provides a greater dampening signal to said controller electronics when said manual input control means is positioned at/or about its null position than when its positioned other than at/or about its null position.

2. A controller system as in claim 1 wherein said selective rate dampening means comprises a switch movable between a first position and a second position, said switch being connected and controlled by a comparator which is connected to said manual control input means through position detecting means, said position detecting means arranged both for detecting the position of said manual control input means and for generating a signal representative thereof and transmitting said signal to said comparator for controlling said switch to be in said second position to provide a relatively high gain signal to said controller electronics means when said manual control input means is at a position about null to increase rate dampening, and for controlling said switch to be in said first position to provide a relative low gain signal to said controller electronic's means to provide relatively lower rate dampening.

3. A controller as in claim 2 further comprising differentiating means for operating on said position signal to generate a signal representative of velocity of movement of said manual control input means, and connected in a manner wherein said position signal and velocity signal are each supplied separately to said selective rate dampening means to be factored into the control of said switch between said first and second positions.

4. A controller as in claim 2 further comprising amplifying means connected to said switch for generating the higher gain or lower gain signal as an output therefrom in accordance with the position of said switch between said first and second positions.

5. A controller as in claim 3 further comprising amplifying means connected to said switch for generating the higher gain or lower gain signal as an output therefrom in accordance with the position of said switch between said first and second positions.

6. A controller as in claim 4 wherein said amplifying means is connected in an inverting amplifier circuit configuration with two resistors connected in parallel with respect to each other and with respect to said amplifying means across an input and output thereof, and said switch being connected between the input of said amplifying means and one of said resistors.

7. A controller as in claim 5 wherein said amplifying means is connected in an inverting amplifier circuit configuration with two resistors connected in parallel with respect to each other and with respect to said amplifying means across an input and output thereof, and said switch being connected between the input of said amplifying means and one of said resistors.

8. A controller as in claim 1 wherein said selective rate dampening means comprises a digital computer having software stored therein adapted for calculating and providing a feedback signal output to provide one of a higher dampening to said control electronics means or lower dampening to said control electronics means based on detection of the position of said manual input control means.

9. A method of dampening oscillations in an active hand controller system having manual input control means connected to a motor comprising the steps of:

detecting the position of the manual input control means;

providing a higher dampened position feedback signal to said motor to be less responsive which results in reduced oscillations when said manual input control means is at or about its null position; and providing a lower dampened position feedback signal to control said motor which provides desired force and feel characteristics at said manual input control means when said manual input control means is other than at or about its null position.

* * * * *